United States Patent [19]

Riggs

[11] 4,304,619
[45] Dec. 8, 1981

[54] METHOD AND APPARATUS FOR OFF-LOADING A COMPLETED UNCURED TIRE

[75] Inventor: Robert S. Riggs, Stow, Ohio

[73] Assignee: The Goodyear Tire & Rubber Company, Akron, Ohio

[21] Appl. No.: 111,553

[22] Filed: Jan. 14, 1980

[51] Int. Cl.³ .............................................. B29H 17/26
[52] U.S. Cl. ................................ 156/126; 156/128 N;
156/396; 224/42.06; 269/55; 414/772; 414/783
[58] Field of Search .................... 156/111, 123 R, 126,
156/128, 394 R, 396; 211/23; 224/42.06;
248/126, 133; 269/55; 414/758, 766, 772, 783

[56] References Cited

U.S. PATENT DOCUMENTS

| | | | |
|---|---|---|---|
| 3,945,866 | 3/1976 | Rudder et al. | 156/126 |
| 4,039,366 | 8/1977 | Yabe | 156/405 |
| 4,093,495 | 6/1978 | Colombani | 156/394 |
| 4,204,903 | 5/1980 | Alexander | 156/394 |

*Primary Examiner*—John E. Kittle
*Attorney, Agent, or Firm*—T. P. Lewandowski

[57] ABSTRACT

A completed, shaped and uncured tire is off-loaded from the tire building machine on which the tire has been built by first engaging the completed tire coaxially within a ring having radially movable segments and then moving the ring with the tire coaxially off the building machine to a chucking device engageable with the inner peripheries of the respective bead portions of the tire. The ring is then expanded and moved coaxially from the tire and the chucking device now holding the tire is rotated to place the tire axis in vertical orientation and elevated to a position above the tire machine where the exterior surface of the tire is grasped by a pair of palms mounted on a swing arm. After the chucking device is moved downwardly clear of the tire, the tire is then moved horizontally by the swing arm and deposited on an overhead belt conveyor to be transported thereby to further processing. The tire building machine operator is relieved of the effort and time required for manual removal of the tire and the completed tire is protected from inadvertent damage due to manual handling. In particular, the tire is elevated from the operating floor in a convenient and expeditious manner.

11 Claims, 3 Drawing Figures

U.S. Patent
Dec. 8, 1981
4,304,619
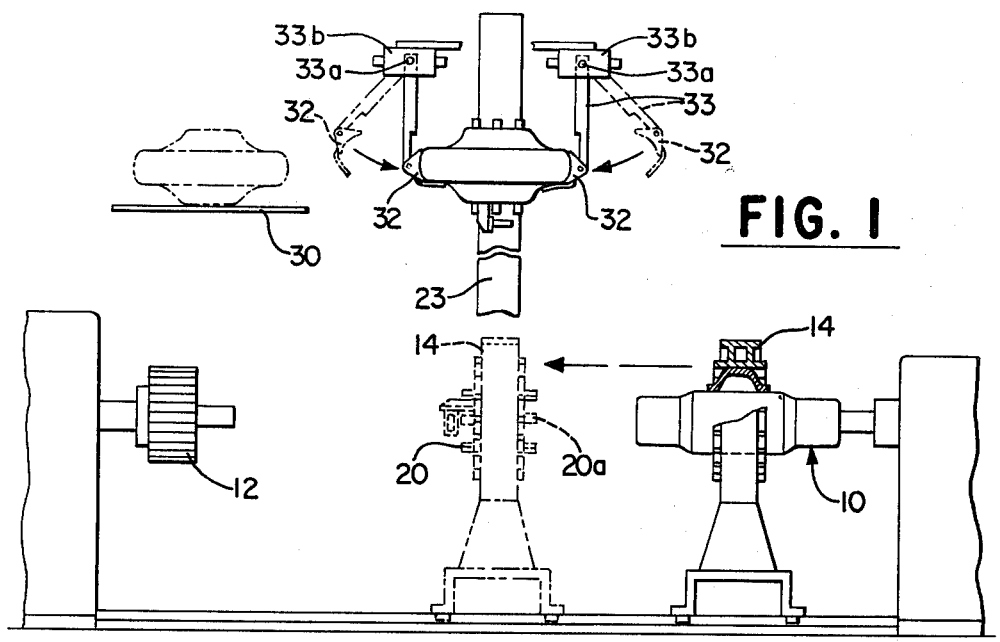
FIG. 1
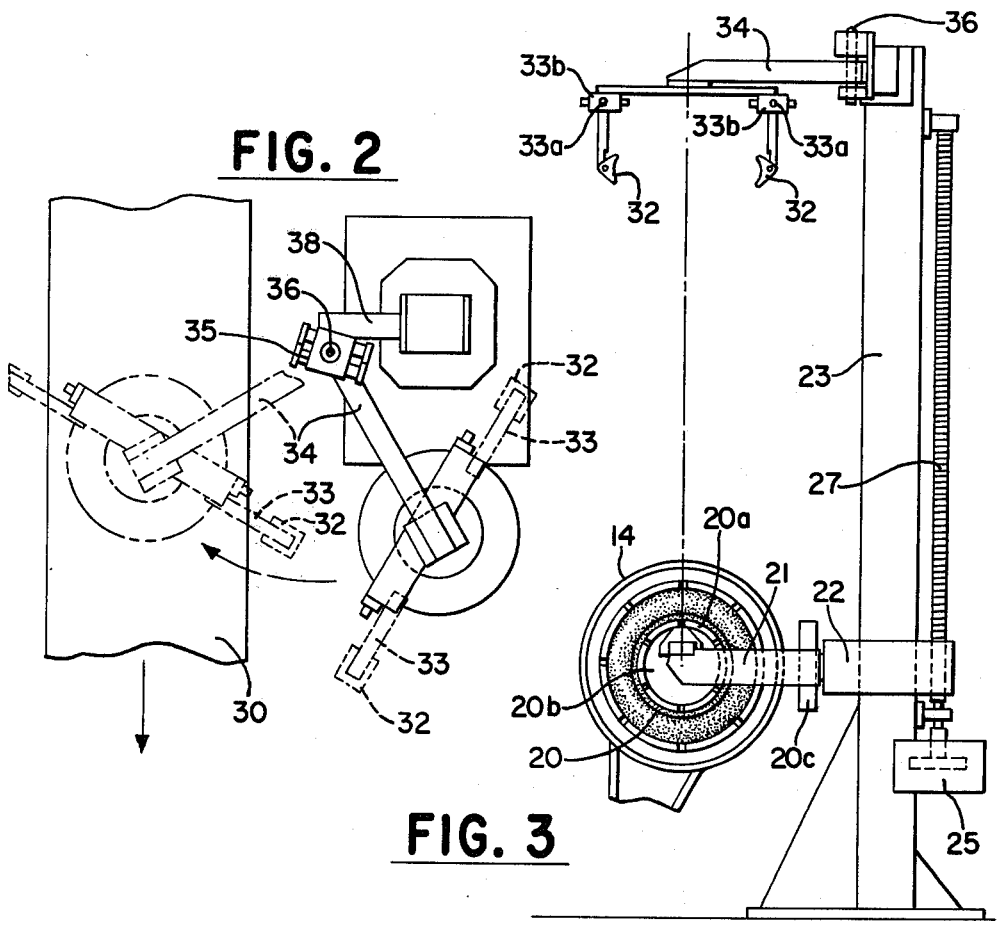
FIG. 2
FIG. 3

METHOD AND APPARATUS FOR OFF-LOADING A COMPLETED UNCURED TIRE

The foregoing abstract is not to be taken as limiting the invention of this application, and in order to understand the full nature and extent of the technical disclosure of this application, reference must be made to the accompanying drawing and the following detailed description.

The instant invention relates to tire building and particularly to the off-loading or removal of a completed but uncured tire from the tire machine on which it has been built. Still more particularly, the invention relates to a method and apparatus for expeditiously moving a completed tire away from the tire building machine to avoid both interference with the building machine operator and possible damage to the tire.

According to one aspect of the invention, there is provided a method of off-loading a completed uncured tire from the tire building machine on which the tire has been assembled and which machine includes drum means for shaping a tire carcass and an expandable transfer ring for applying an endless tread on the carcass, the ring being movable coaxially of the drum means, said method comprising: disposing the transfer ring symmetrically about the completed tire on the drum means and constricting the transfer ring to engage the tire tread, then collapsing the drum means to release the tire, moving the transfer ring with the tire engaged therein coaxially off the collapsed drum, engaging the bead portions of the tire held in the transfer ring by chucking means located coaxially of the transfer ring, and expanding the ring to release the tire now held by the chucking means and moving the ring coaxially away from the chucking means, carrying the chucking means and the tire thereon to orient the tire axis vertically and elevating the chucking means with the tire to an elevation higher than said building machine, and depositing the tire on a horizontal conveyor situated at an elevation higher than the tire machine for removal from the vicinity of the tire machine.

According to another aspect of the invention, there is provided an apparatus for off-loading a shaped uncured tire from tire building means on which said tire has been assembled, the apparatus comprising ring means movable coaxially of the building means to engage the outer periphery of said tire and to carry said tire coaxially off said building means, internal chucking means mounted for movement perpendicularly of the axis of the building means to a first position coaxial with said ring means for coaxially engaging the inner periphery of at least one of the bead portions of said tire and to hold said tire at said first position while said ring means moves coaxially away from the tire, lift means operable after movement of the ring means away from the tire to lift said chucking means and said tire to a second position above said building means, and tire embracing means symmetrically engageable with the exterior surface of said tire in said second position and movable, after movement of the chucking means downwardly to a third position intermediate the first and the second said position, to move the tire horizontally to deliver the tire to conveying means at an elevation above said building means.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 1 is a schematic elevation view of an apparatus embodying the invention;

FIGS. 2 and 3 are respectively a plan view and a side elevation view of the apparatus of FIG. 1.

Referring to the drawings, a particularly preferred embodiment of the present invention is useful in connection with a tire building apparatus such as that illustrated schematically in FIG. 1 which apparatus includes a tire shaping drum 10 and a belt and tread assembly drum 12 spaced from and coaxial with the building drum. Such tire building machines are commonly provided with a transfer ring 14 having a plurality of radially movable segments which can be placed about a belt and tread package built on the drum 12 so that the segments of the transfer ring can be moved radially inwardly a distance sufficient to embrace the belt tread package. The belt and tread assembly drum is then collapsed and the transfer ring is moved coaxially to a position symmetrical with the mid-circumferential plane of a tire carcass disposed on the tire shaping drum 10. The carcass is then expanded so as to unite the carcass and the belt tread package to form a complete but uncured tire.

Customarily, the transfer ring is then removed to an idle position somewhere between the drum 10 and the drum 12.

In the present embodiment, the transfer ring 14 is employed again after the tire has been completely assembled on the shaping dum 12. The ring is again positioned symmetrically with the mid-circumferential plane of the tire and the segments moved radially inwardly sufficiently to engage the tread of the tire. Then, the shaping dum 12 being collapsed to permit removal of the tire, the transfer ring with the tire therein is moved coaxially from the drum.

To receive the tire from the transfer ring an internal chucking device 20 is disposed coaxially of the transfer ring so that as the ring is moved off the shaping drum the tire held in the ring is carried coaxially over the chucking device which is then expanded by any suitable expanding means so as to engage the inner peripheries of each of the respective bead portions of the tire. The segments of the transfer ring are then moved radially outwardly to release the tire which is then held in its coaxial position relative to the shaping drum by the chucking device. The transfer ring is returned to its idle position.

The chucking device 20 expanding means is provided by a plurality of bars 20a movable radially of a hub 20b to engage and to release the tire bead portions. Each bar is fixed to a radial slide, of the hub, which slides are actuated by a radial screw having a corotatable bevel pinion. The bevel pinions mesh with and are driven by a bevel gear mounted coaxially in the hub and rotated by a drive chain operated by a reciprocating motor 20c which is mounted on the arm 21. Suitable alternative expanding means will be readily perceived by persons skilled in the related arts.

The chucking device 20 is mounted on the arm 21 of a lift means including a traveller 22 which is movable vertically along a column 23, being driven by a conventional screw drive 25 powered by driving means for rotating the screw 27.

The arm 21 is mounted rotatably in the traveller 22 about an axis which is perpendicular to the column 23 so that during the upward movement of the traveller the chucking device can be rotated from its horizontal orientation to a vertical orientation positioning the tire with its axis vertical. The chucking device then carrying the tire moves upwardly to an elevation above the tire building machine.

To engage the tire and carry it horizontally to a position disposed over the overhead conveyor 30, the apparatus includes a plurality of palms 32 which are respectively movable radially of the tire while the same is held in its elevated position by the chucking device. Each palm 32 is mounted on an arm 33 which can be swung about a pivot pin 33a by a rotation device 33b, to move the palms to and away from the tire. The chucking device is then collapsed and moved downwardly to an intermediate storage position, the tire then being held between the palms. The palms are mounted on a swing arm 34 which is swingable in a horizontal plane about a vertical axis defined by a pivot pin 36 disposed in a bracket 38 which is mounted near the upward end of the column 23. The arm 34 is movable, being driven by a conventional rotary drive unit 35 from a first location for receiving a tire from the chucking device 20 to a second location wherein the tire is disposed at only a small elevation above the surface, and between the lateral margins, of the conveyor means 30 whereupon the palms 32 are moved radially away from the tire to deliver the tire to the conveyor means for transport to subsequent operations, including curing.

The invention, particularly the preferred embodiments thereof, provide a particular advantage in that the operator is relieved of the effort and time required for carefully removing each tire from the tire shaping drum, as well as of the handling of an impressive total weight during the course of a working day either in the large number of relatively lightweight tires or of a lesser number of relatively heavy tires each of which requires considerable skill carefully to remove from the shaping drum. Moreover, a completed tire is not only carefully moved exactly coaxially with the drum thereby avoiding interferences which could damage the tire but is maintained fully under positive control at each step of its movement after being released from the shaping drum until the tire is placed on the surface of the flat belt conveyor. It is a further notable advantage of the invention that the tires are immediately moved from operating area so as not to interfere with the necessary movements of the operator controlling the tire building process.

While certain representative embodiments and details have been shown for the purpose of illustrating the invention, it will be apparent to those skilled in the art that various changes and modifications may be made therein without departing from the spirit or scope of the invention.

What is claimed is:

1. A method of off-loading a completed uncured tire from the tire building machine on which the tire has been assembled and which machine includes drum means for shaping a tire carcass and an expandable transfer ring for applying an endless tread on the carcass, the ring being movable coaxially of the drum means, said method comprising: disposing the transfer ring symmetrically about the completed tire on the drum means and constricting the transfer ring to engage the tire tread, then collapsing the drum means to release the tire, moving the transfer ring with the tire engaged therein coaxially off the collapsed drum, engaging the bead portions of the tire held in the transfer ring by chucking means located coaxially of the transfer ring, and expanding the ring to release the tire now held by the chucking means and moving the ring coaxially away from the chucking means, carrying the chucking means and the tire thereon to orient the tire axis vertically and elevating the chucking means with the tire to an elevation higher than said building machine, and depositing the tire on a horizontal conveyor situated at an elevation higher than the tire machine for removal from the vicinity of the tire machine.

2. The method as claimed in claim 1, and after elevating the chucking means and the tire, engaging the outside of the tire by tire embracing means, then releasing and lowering the chucking means while the tire is held in the embracing means, and subsequently moving the embracing means to position the tire closely above the conveyor and releasing the tire from the embracing means to the conveyor.

3. The method as claimed in claim 1, wherein the transfer ring is disposed about the tire after the tread previously applied to the tire carcass has been consolidated to form the tire.

4. The method as claimed in claim 1, 2, or 3, wherein the chucking means being maintained in an idle position at an elevation between a first position coaxial with the ring to receive the tire and a second position coaxial with and at the elevation of the embracing means, while a tire carcass and a tire tread are being assembled to form the tire.

5. The method as claimed in claim 4, wherein the chucking means in the first position thereof is disposed horizontally and in the second position thereof is disposed vertically.

6. An apparatus for off-loading a shaped uncured tire from tire building means on which said tire has been assembled, the apparatus comprising ring means movable coaxially of the building means to engage the outer periphery of said tire and to carry said tire coaxially off said building means, internal chucking means mounted for movement perpendicularly of the axis of the building means to a first position coaxial with said ring means for coaxially engaging the inner periphery of at least one of the bead portions of said tire and to hold said tire at said first position while said ring means moves coaxially away from the tire, lift means operable after movement of the ring means away from the tire to lift said chucking means and said tire to a second position above said building means, and tire embracing means symmetrically engageable with the exterior surface of said tire in said second position and movable, after movement of the chucking means downwardly to a third position intermediate the first and the second said position, to move the tire horizontally to deliver the tire to conveying means at an elevation above said building means.

7. Apparatus as claimed in claim 6, said building means including a belt tread building drum and a carcass shaping drum, said ring means comprising a transfer ring having a plurality of radially movable segments and operable to transfer an endless belt tread package from said belt tread building drum to a tire carcass disposed on said shaping drum.

8. Apparatus as claimed in claim 6, said lift means comprising a column positioned outwardly and rearwardly of the axis of the building means, a traveller mounted for movement relatively of the column and having an arm extending perpendicularly of the column toward said axis, said internal chucking means being mounted on the outward end of said arm, and driving means for moving said traveller relatively of the column.

9. Apparatus as claimed in claim 6, 7, or 8, said tire embracing means comprising a plurality of palms movable radially of the tire, a swing arm supporting said palms and swingable in a horizontal plane about a vertical axis fixed in space relative to said column between a first location for receiving a tire from said chucking means and a second location for delivering the tire to said conveyor means.

10. Apparatus for off-loading an uncured tire from tire building means on which said tire has been assembled and which building means includes a shaping drum and a transfer ring having radially movable segments and wherein said ring and said drum are spaced coaxially of each other along a building axis, said apparatus comprising inside chuck means for engaging the inward circumference of said tire, arm means having a longitudinal axis perpendicular to said building axis and carrying said inside chuck means adjacent to one of its axial ends, traveller means including means mounting said arm means for rotation about its longitudinal axis, column means supporting said traveller means for movement vertically, screw drive means mounted on said column means and engaging said traveller means for effecting said vertical movement, and tire embracing means for engaging the exterior surface of said tire at a plurality of arcuately spaced locations about said tire, swing arm means mounted on said column means to swing in a horizontal plane about a pivot adjacent one of its ends and having said embracing means attached at the other of its ends, driving means for moving said embracing means between a position disposed immediately above a horizontal conveyor and another position disposed in coaxial alignment with the chucking means while the latter is in its axis vertical orientation.

11. An apparatus for off-loading a shaped uncured tire from the tire building drum on which the tire has been assembled, the apparatus comprising:
means for engaging the outward periphery of and moving the tire coaxially from the drum;
chucking means for engaging the inward periphery of a bead portion of the tire and holding the tire while the first said means is moved away from the tire;
lift means connected to the chucking means to move the latter upward to an elevation above the drum;
and tire embracing means disposed above the drum to embrace a tire held by the chucking means at said elevation and swingable to transfer a tire to a conveyor from the chucking means.

* * * * *